(12) United States Patent
Chen (10) Patent No.: US 12,533,058 B2
(45) Date of Patent: Jan. 27, 2026

(54) BIOCHEMICAL DETECTION WITH ULTRA WIDEBAND COHERENT OPTICAL COMBS

(71) Applicant: II-VI Delaware, Inc., Wilmington, DE (US)

(72) Inventor: Young-Kai Chen, New Providence, NJ (US)

(73) Assignee: II-VI DELAWARE, INC., Wilmington, DE (US)

( * ) Notice: Subject to any disclaimer, the term of this patent is extended or adjusted under 35 U.S.C. 154(b) by 383 days.

(21) Appl. No.: 18/220,482

(22) Filed: Jul. 11, 2023

(65) Prior Publication Data

US 2025/0017498 A1    Jan. 16, 2025

(51) Int. Cl.
*A61B 5/1455*    (2006.01)
*A61B 5/145*    (2006.01)
*A61B 5/00*    (2006.01)

(52) U.S. Cl.
CPC ........ *A61B 5/1455* (2013.01); *A61B 5/14532* (2013.01); *A61B 5/6801* (2013.01)

(58) Field of Classification Search
CPC .............. A61B 5/1455; A61B 5/14552; A61B 5/14532; A61B 5/6801
See application file for complete search history.

(56) References Cited

U.S. PATENT DOCUMENTS

| 7,751,862 B2 * | 7/2010 | Hogan | A61B 5/1455 600/310 |
| 8,577,432 B2 * | 11/2013 | Hogan | A61B 5/14532 600/310 |
| 9,554,738 B1 * | 1/2017 | Gulati | A61B 5/14546 |

FOREIGN PATENT DOCUMENTS

| CN | 107328474 | 11/2017 |
| CN | 108267413 | 7/2018 |

(Continued)

OTHER PUBLICATIONS

Marks D L et al, "Molecular identification by generating coherence between molecular normal modes using stimulated Raman scattering", Optics Letters, Optical Society of America, US, vol. 34, No. 12, Jun. 15, 2009 (Jun. 15, 2009), pp. 1756-1758.

(Continued)

*Primary Examiner* — Eric F Winakur
(74) *Attorney, Agent, or Firm* — McAndrews, Held & Malloy, Ltd.

(57) ABSTRACT

Systems and methods are provided for biochemical detection with ultra wideband coherent optical combs. An example biosensor includes an optical excitation source configured to generate an optical excitation signal, a programmable optical filter, an optical detector, and detection circuitry configured to apply coherent mixing detection. During a biosensory operation the optical excitation signal is applied to a biochemical sample that includes at least one targeted biochemical agent, and the optical detector captures a first signal that includes spectral responses corresponding to applying the optical excitation signal. The programmable optical filter applies optical filtering to a copy of the optical excitation signal, based on a matching target reference signal for the targeted biochemical agent, to generate second signal. The detection circuitry applies coherent mixing detection to the first signal and the second signal generated. Applying the coherent mixing detection includes combining the first signal and the second signal line-by-line.

20 Claims, 6 Drawing Sheets

(56) References Cited

FOREIGN PATENT DOCUMENTS

| | | |
|---|---|---|
| CN | 110749873 | 2/2020 |
| JP | S57-175957 | 10/1982 |
| JP | 2022103205 | 7/2022 |

OTHER PUBLICATIONS

Joseph B. Geddes III et al, "Optical pulse shaping for selective excitation of coherent molecular vibrations by stimulated Raman scattering", Proceedings of SPIE, Visual Communications and Image Processing 2005, vol. 7183, Feb. 12, 2009 (Feb. 12, 2009), p. 718311.

Zhang Zhe et al, "Femtosecond imbalanced time-stretch spectroscopy for ultrafast gas detection", Applied Physics Letters, American Institute of Physics, 2 Hungtington Quadrangle, Melville NY 11747, vol. 116, No. 17, Apr. 28, 2020.

Znakovskaya I et al, "Dual frequency comb spectroscopy with a single laser", Optics Letters, Optical Society of America, US, vol. 39, No. 19, Oct. 1, 2014, pp. 5471-5474.

Japanese Office Action for Application No. 2024-076982, dated Jul. 28, 2025, 4 pages.

\* cited by examiner

BIOCHEMICAL DETECTION WITH ULTRA WIDEBAND COHERENT OPTICAL COMBS

TECHNICAL FIELD

Aspects of the present disclosure relate to sensory related solutions, and particularly to biochemical detection. More specifically, certain implementations of the present disclosure relate to methods and systems for implementing and utilizing biochemical detection with ultra wideband coherent optical combs.

BACKGROUND

Limitations and disadvantages of conventional and traditional devices and solutions for biochemical detection will become apparent to one of skill in the art, through comparison of such systems with some aspects of the present disclosure as set forth in the remainder of the present application with reference to the drawings.

BRIEF SUMMARY

System and methods are provided for biochemical detection with ultra wideband coherent optical combs, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
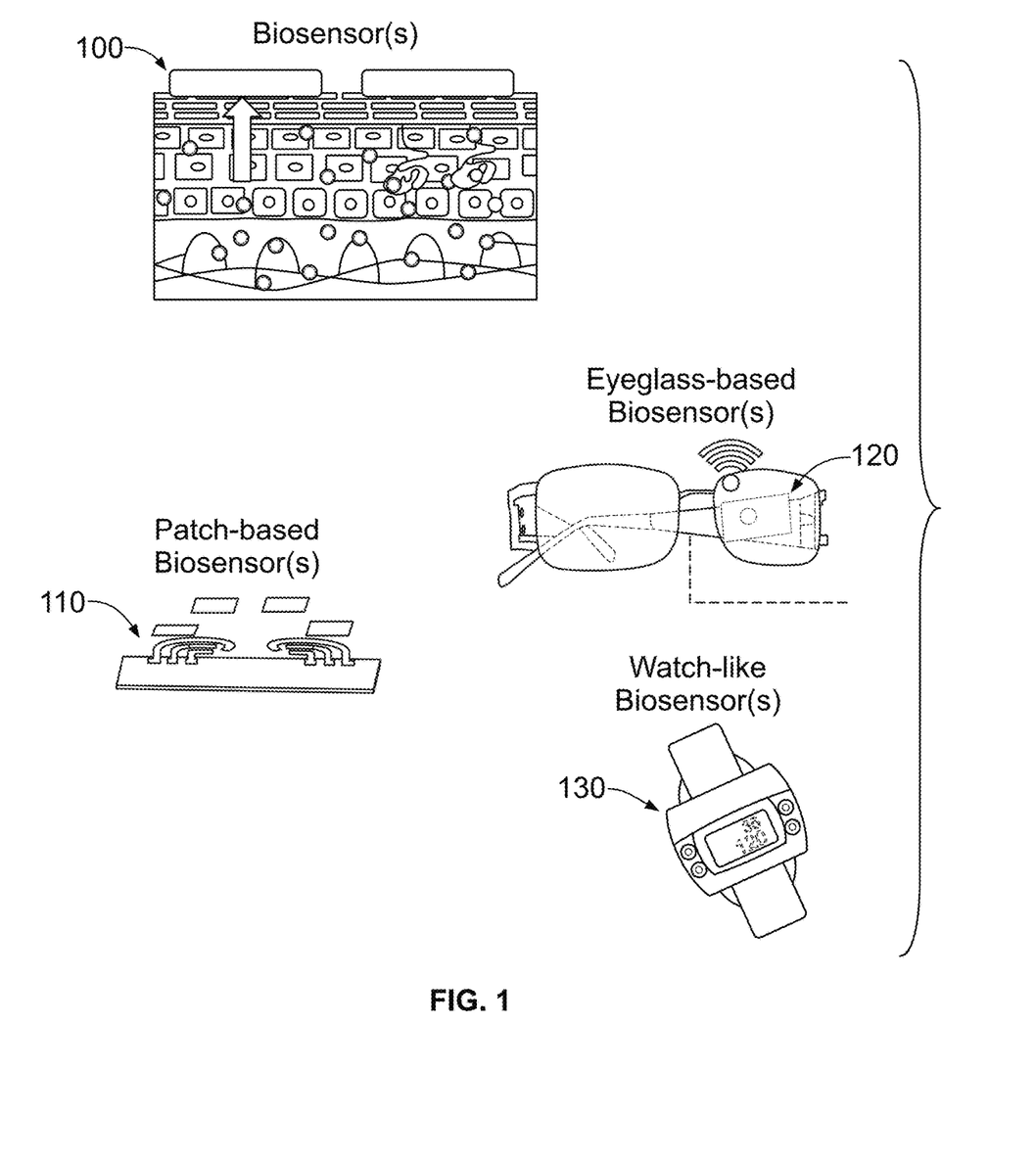
FIG. 1 illustrates example bio-fluid based sensors.

FIG. 1 illustrates example bio-fluid based sensors. Shown in FIG. 1 are biosensor(s) 100, patch-based biosensor(s) 110, eyeglass-based biosensor(s) 120, and watch-like biosensor(s) 130.

In this regard, a biosensor is an analytical sensory device configured for use for the detection of particular biochemical substance or agent (e.g., biochemical compounds or molecules). Typically, biosensors combine biological component(s) with physicochemical detection component(s). For example, a biosensor may comprise a bio-receptor (e.g., of enzymes, antibodies, cells, nucleic acids, etc.), a transducer (e.g., semi-conducting material/nanomaterial), and an electronic component for providing one or more functions (e.g., signal amplification, signal processing, etc.). In some instances, the biosensor may also incorporate additional components for providing additional functions, such as a transceiver for communicating data to/from the biosensor, input/output (I/O) components for enabling user input/output, etc. Where applicable, components of biosensors may comprise suitable circuitry and other physical subcomponents for implementing various aspects of the functions performed by these components.

One example type of biosensors is glucose biosensors, which are used in sensing (measuring) glucose in the human body. In this regard, biosensor(s) 100, patch-based biosensor(s) 110, eyeglass-based biosensor(s) 120, and watch-like biosensor(s) 130 may correspond to different example implementations of such glucose biosensors. Each of these biosensors may be configured for operating by sensing particular bio-fluids, to facilitate measuring of glucose in the body.

For example, the biosensor(s) 100 may represent the most common implementation for bio-fluid sensing, comprising physical sensor(s) in a suitable housing configured for measuring glucose in such fluids as sweat or blood. In this regard, in some instances, the biosensor(s) 100 may be configured to prick or otherwise penetrate the skin, thus enabling the measuring of glucose. The other biosensors represent alternative solutions, where the sensory (and measurement) is done without necessary pricking the skin. For example, the watch-like biosensor 130 may be an electrochemical glucometer configured for sensing interstitial fluid (ISF)—that is, for sensing and measuring glucose in sweat expelled on the surface of the skin, in the area under the watch-like biosensor(s) 130. Similarly, the wearable patch-based biosensor 110 may be a glucose monitor configured for ISF sensing—that is, for sensing and measuring glucose in sweat expelled onto the surface of the skin, in the area under the patch-based biosensor 110. The eyeglass-based biosensor 120 may be a glucose monitor configured for capturing optical properties of ISF in eye or tears, and sensing and measuring glucose therein. Other types of glucose monitors may also be used, such as integrated contact lens glucose sensors for sensing tears, temporary tattoo-based glucose monitors configured for ISF sensing, etc.

As noted, while some biosensors, such as bio-fluid based sensors, may need to be used in an invasive way (e.g., pricking the skin), it is preferred to perform the biosensing in a non-invasive way. Thus, some biosensors may incorporate detection techniques that may work in a non-invasive manner. In some instances, biosensing may be implemented using, e.g., optical based detection, such as by measuring and assessing matching response to detect presence, and optionally measuring amount of particular biochemical substance or agent (e.g., particular biochemical compound, molecule, etc.). For example, each of the biosensor(s) 100, patch-based biosensor(s) 110, eyeglass-based biosensor(s) 120, and watch-like biosensor(s) 130, as shown in FIG. 1, may be configured for performing the glucose biosensory functions attributed thereto using optical based detection. Nonetheless, the present disclosure is not limited to glucose biosensors, and solutions based on the present disclosure may be used in any suitable biosensor where optical detection may be utilized.

The optical based detection may be done using photonic detection based on matching response. This may be done by applying a light source, such as a laser source, onto particular bio-fluid or any suitable biochemical material, and then detecting and measuring the spectral response. The spectral response may then be matched with available known response data—e.g., absorbance characteristics for identified biochemical substances, over particular wavelengths—to identify biochemical compounds or molecules that may be present. Photonic detection based on matching response is described in more detail with respect to FIG. 2.

Figure 2:
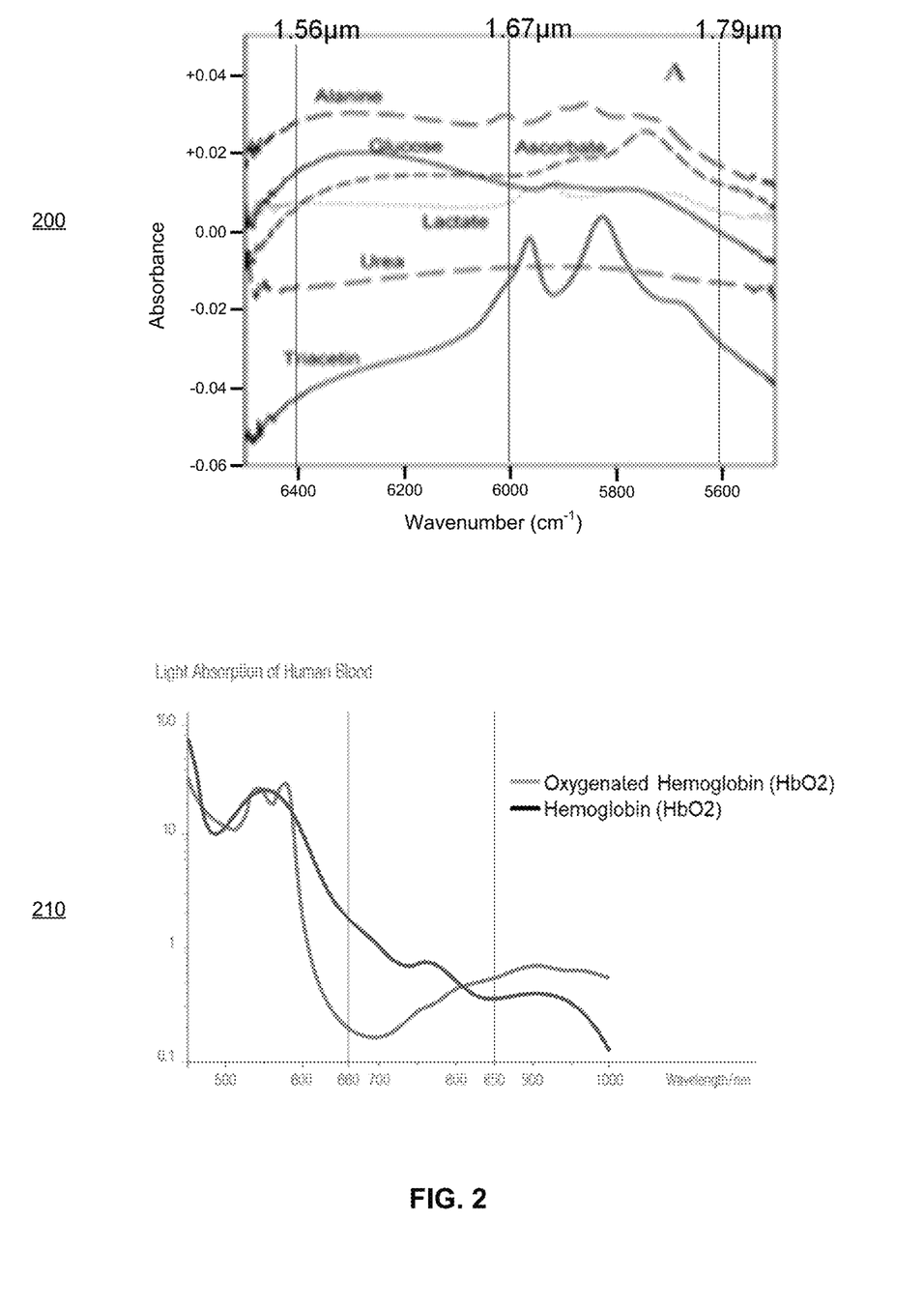
FIG. 2 is a graph diagram illustrating spectral responses that may be used in match response for optical (photonic) detection.

FIG. 2 is a graph diagram illustrating spectral responses that may be used in match response for optical (photonic) detection. Shown in FIG. 2 are graphs 200 and 210.

In this regard, graph 200 comprises data representing near-infrared spectroscopy (NIR) based absorption response (y-axis) as a function of wavelength (x-axis). In particular, the data captured in graph 200 correspond to different biochemical material/molecules, such as Urea, Lactate, Triacetin, Ascorbate (Vitamin C), Alanine, and Glucose. As illustrated in graph 200, while there is no or little clear resonances in the first overtone region, over the whole spectrum, different molecules exhibit different absorption behavior. Graph 210 comprises data representing Mid-infrared (Mid-IR) spectroscopy based absorption response (y-axis) as a function of wavelength (x-axis). In particular, the data captured in graph 200 illustrates light absorbance of human blood, particularly by (unoxygenated) hemoglobin and oxygenated hemoglobin. As shown in graph 210, the data is obtained using illumination in a particular wavelength range (e.g., 2.5-25 µm or 2.5-10 µm), such as by using quantum cascade lasers. As illustrated in graph 210, hemoglobin exhibits absorption response peaking at ~3.3 µm and ~7.1 µm, with stronger signal absorbance at ~8.3-10 µm. Nonetheless, unoxygenated hemoglobin exhibit different absorption behavior than oxygenated hemoglobin over the whole spectrum.

As noted above, biosensors incorporating matching response based detection may take advantage of known spectral response (e.g., as that shown in graphs 200 and 210). In this regard, in solutions utilizing optical (photonic) detection based on response matching, laser light is projected onto a sample being tested, and then the spectral response is measured and analyzed, e.g., with respect to such known spectral response. Doing this over a wide band of the spectrum allows for constructing a spectral response that may be matched against spectral responses of known molecules.

Conventional solutions, which may utilize matching response based on detected amplitudes over multiple wavelengths, may have some limitations and/or disadvantages. In this regard, various designs may be used for implementing response matching based optical (photonic) detection. For example, in some implementations, a plurality of narrow linewidth lasers may be used to map out the intensity response over a wide spectral range (at different frequencies or wavelengths), to identify targeted biochemical agent(s) based on pre-determined absorption spectral response(s) of the reference agent(s). In this regard, a target (e.g., a sample of bio-fluid, etc.) may be illuminated, such as by using an array of lasers with known wavelengths. The array-based implementations may incorporate an array of lasers (with high power consumption), with each laser locked to a prescribed wavelength. Alternatively, tunable laser(s) may be used to sample the spectral response at different wavelength(s), such as by scanning at least a part of the spectrum, line-by-line (e.g., at different frequencies or wavelengths) over a time period. This may pose some issues, however, as the target absorption intensity at each wavelength point may vary with time, temperature, size, etc. The agent may also move, and as such the longer the scanning and detection takes, the more uncertainty may be introduced. Further, measuring the spectral response may typically require measuring both phase and amplitude. However, in conventional solutions, it may not be possible to capture both phase and amplitude data at the same time. In this regard, capturing phase response of the targeted biochemical agent (e.g., molecule) may not be possible, as target absorption spectra may be buried by many surrounding materials with similar ensemble responses.

Solutions based on the present disclosure may address some of the limitations and disadvantages of conventional solutions. In this regard, implementations based on the present disclosure may incorporate various features to allow for improved detection of biochemical agents (e.g., compounds, molecules, etc.) even in the presence of surrounding materials with similar responses. For example, highly correlated dense optical frequency laser comb sources may be utilized, to enable recording correlated intensity and phase responses of a targeted agent over a wide spectral range, and to do so simultaneously in a short snapshot to avoid the motion of agent. Coherent detection may be provided, such as by mixing spectral comb lines of absorbed optical response from an unknown sample with a pre-trained reference optical comb response bearing the spectral response of a targeted biochemical agent (e.g., molecule), which may be obtained via a reference path. In particular, line-by-line spectral mixing of the sample signal with a spectral response reference signal may be done, such as in a photodetector, which emphasizes the correlated spectral products of the response of a targeted agent with the reference, while discriminating the background and noises. An optical frequency laser comb source, such as a mode-locked or gain-switched laser, may be used as an optical excitation source to illuminate both the targeted agent and a pre-trained reference filter, in the reference path, to be mixed into a detector. Alternatively, rather than utilized programmed/trained optical filter in the reference path, real sample of a targeted agent may be used. As the line-by-line frequency responses from the targeted agent and the reference filter come from the same source, thus the coherent mixing in one detector to collect the ensemble similarity of amplitude and phase for each comb line over the whole spectral range. Such coherent detection with one detector avoids the need to lock the lasing frequencies to a known frequency standard and a bank of detectors to collect line-by-line frequency responses in the legacy methods.

The spectral response reference signal may be coherently created by passing part of the same excitation laser comb source through a prescribed optical filter whose spectral shape and response (also referred to as "reference filter response") are programmed to emulate the targeted biochemical agent (e.g., molecule). The reference filter response may be constructed to emulate collected library data (e.g., training with a verified data set) or trained to fit the responses with a known agent as the targeted sample (e.g., training with a known physical reference material). In some instances, advanced processing techniques, such as by artificial intelligence (AI) (e.g., machine learning (ML)) based processing, may be used in controlling various aspects of the detection process, such as the construction of the reference filter response to increase the accuracy of emulation under controlled environmental noises. An example implementation of a biosensor based on the present disclosure is illustrated in and described with respect to FIG. 3.

Figure 3:
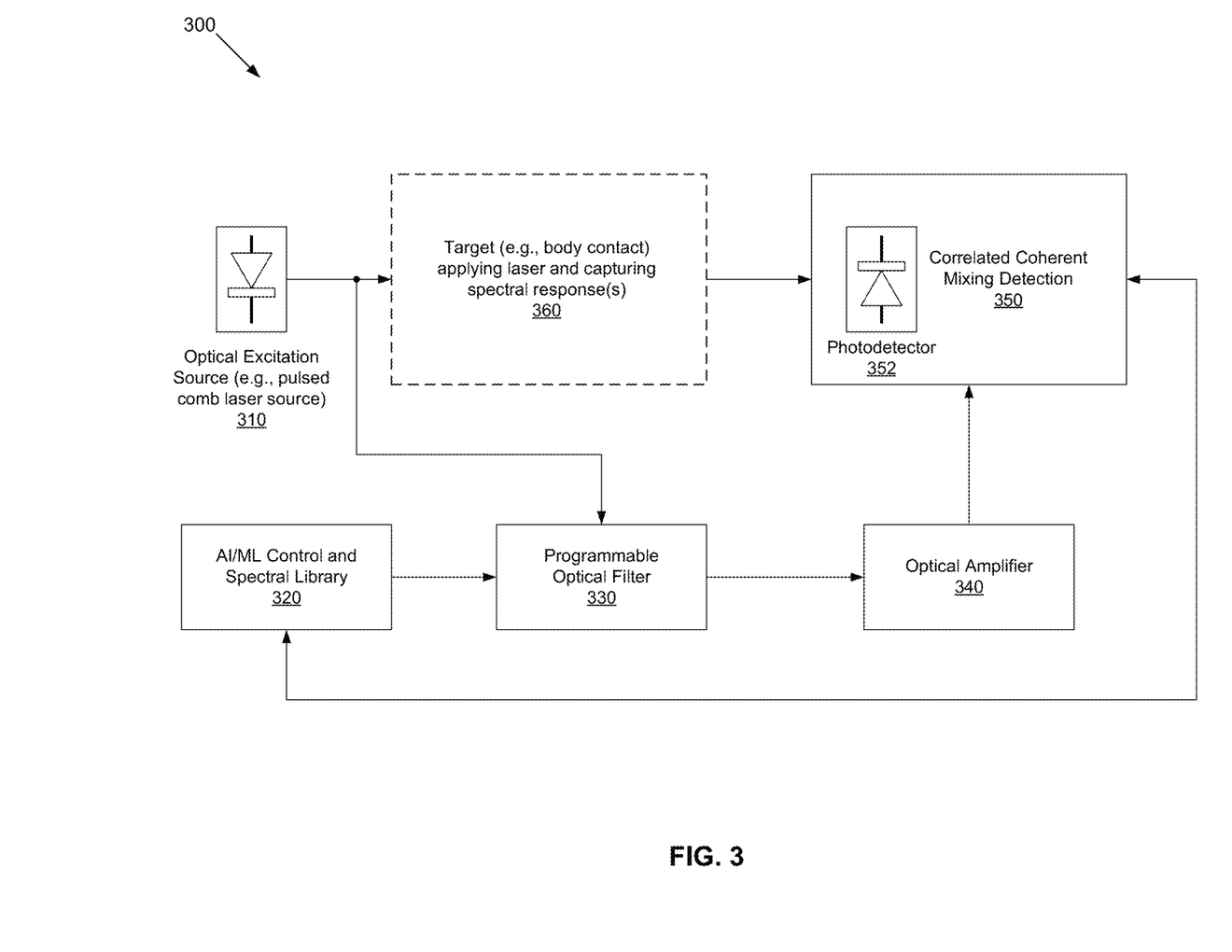
FIG. 3 is a block diagram illustrates an example biosensor system based on the present disclosure.

FIG. 3 is a block diagram that illustrates an example biosensor system based on the present disclosure. Shown in FIG. 3 is biosensor system (or portion thereof) 300.

The biosensor system 300 may comprise suitable circuitry for performing optical biosensory based functions based on the present disclosure. In particular, the biosensor system 300 may be configured to perform enhanced biochemical detection with optical excitation signals (e.g., laser signals), such as using a set of ultra wideband coherent optical combs, as described herein. As shown in the example implementation illustrated in FIG. 3, the biosensor system 300 comprises an optical excitation source 310, a control and spectral library block 320, a programmable optical filter 330, an optical filter 340, and a correlated coherent mixing detection block 350.

The optical excitation source 310 may comprise suitable circuitry for generating and outputting excitation signals meeting specific pre-determined characteristics. In particular, the optical excitation source 310 is configured to generate an optical excitation signal with an emitting spectrum consisting of a series of discrete frequency lines. In this regard, equal spacing between comb lines is not required. In one example implementation, two responses of each frequency line for each single line may be obtained, and then the line-by-line results may be added together in one detector. This may be referred to as self-referencing line-by-line mixing. In an example implementation, the optical excitation source 310 may comprise a pulsed comb laser source configured to emit laser excitation signals meeting specific pre-determined characteristics, such as being emitted from a mode-locked laser, a gain-switch laser, or a set of coherent comb lines produced by a non-linear medium.

The control and spectral library block 320 may comprise suitable circuitry for providing control related optical-shaping functions of the optical filter as well for maintaining a spectral library of reference signals emulating various known agents for use during processing in the biosensor system 300. In this regard, the control and spectral library block 320 may be configured to generate and convey control signal(s) for controlling operation of the optical responses of one or more other reference components in the biosensor system 300. Further, the control and spectral library block 320 may provide reference optical response of the comb source ready to perform coherent detection with targeted biochemical agents. In this regard, the control and spectral library block 320 may maintain a spectral library for one or more agents. The control and spectral library block 320 may be configured to generate and/or update spectral related data to emulate (including, e.g., reference signals) the one or more agents. In some instances, the control and spectral library block 320 may be configured to update the spectral library based on feedback data obtained from processing particular agents learned in the biosensor system 300.

In some instances, the control and spectral library block 320 may be configured to incorporate use of advanced processing techniques, such as AI/ML based processing. In this regard, the AI/ML based processing may be used, e.g., for the construction and/or modification of data (e.g., references signals) in the spectral library. For example, constructing and updating reference matching response spectral signals may be done using machine learning (ML) algorithms. Such machine learning (ML) algorithms may comprise, e.g., linear regression based algorithms, nonlinear regression based algorithms, logistic regression based algorithms, decision tree ensemble (such as gradient boosting or random forests) based algorithms, neural networks based algorithms, recurrent neural networks based algorithms, long-short-term memory networks, Gaussian process algorithms, Bayesian algorithms, graph neutral networks, hyper-dimensional compute, generative adversarial network, transformers, Chat-GPT, large language models, and the like.

The programmable optical filter 330 may comprise suitable circuitry for performing optical filtering. In this regard, the programmable optical filter 330 may be configured to filter an input signal based on a pre-programmed filtering spectral shape and response—that is, the reference filter response of the programmable optical filter 330. The reference filter response may be programmed based on a reference signal provided by the control and spectral library block 320.

The optical amplifier 340 may comprise suitable circuitry for performing optical amplification to an input signal. In this regard, the optical amplifier 340 may be configured to apply pre-defined gain and/or time delay to the input signal to calibrate and optimize coherent detection from the hardware differences in the test setups between two signal paths going through the sample and the reference filter. In some instances, the optical amplifier 340 may be programmable, with the gain and delay applied thereby being calibrated (e.g., in coordination with the control and spectral library block 320, or any other controller in the system).

The correlated coherent mixing detection block 350 may comprise suitable circuitry for performing optical detection, and may do so specifically based on correlated coherent mixing as described herein.

In operation, the biosensor system 300 may be used to perform biochemical detection. In this regard, the optical excitation source 310 may provide an excitation signal source (e.g., laser) for use in biochemical sensing. The excitation signal is adaptively configured to enable recording both intensity and phase responses over a wide spectral range, and to do so simultaneously (or at least concurrently) to passing through both the target agent and reference optical filter in parallel. In particular, the excitation signal generated by the optical excitation source 310 may comprise signals (e.g., laser pulse signal) having a spectrum that consists of a series of discretely spaced combs (frequency lines). Part of the excitation signal passes through a target (e.g., body contact) 360, with the corresponding spectral responses being captured, such as by a photodetector 352. In this regard, the spectral responses may comprise, in addition to the spectral response of the targeted biochemical agent, together with other spectral response corresponding to surrounding material (thus constituting, effectively, noise).

The other portion of the excitation signal is also provided—that is, as an input signal—to the programmable optical filter 330, which may be configured to apply a pre-trained optical filtering response based on preset criteria of a reference agent. Specifically, the programmable optical filter 330 may be programmed by the control and spectral library block 320. In this regard, to facilitate the programming, the control and spectral library block 320 may provide a control and programming of the filter to produce a spectral response emulating the reference agent by the programmable optical filter 330. Thus, the programmable optical filter 330 generates, as an output, a signal representing the spectral response of the matching target spectral reference signal at the output of the programmed optical filter. The output of the programmable optical filter 330 is then amplified via the optical amplifier 340, with the output of the optical amplifier 340 then being inputted into the correlated coherent mixing detection block 350 for use in coherent mixing with the captured spectral responses simultaneously. An example use case in the biosensor system 300 is illustrated in and described in more detail with respect to FIGS. 4A-4B.

Figure 4A:
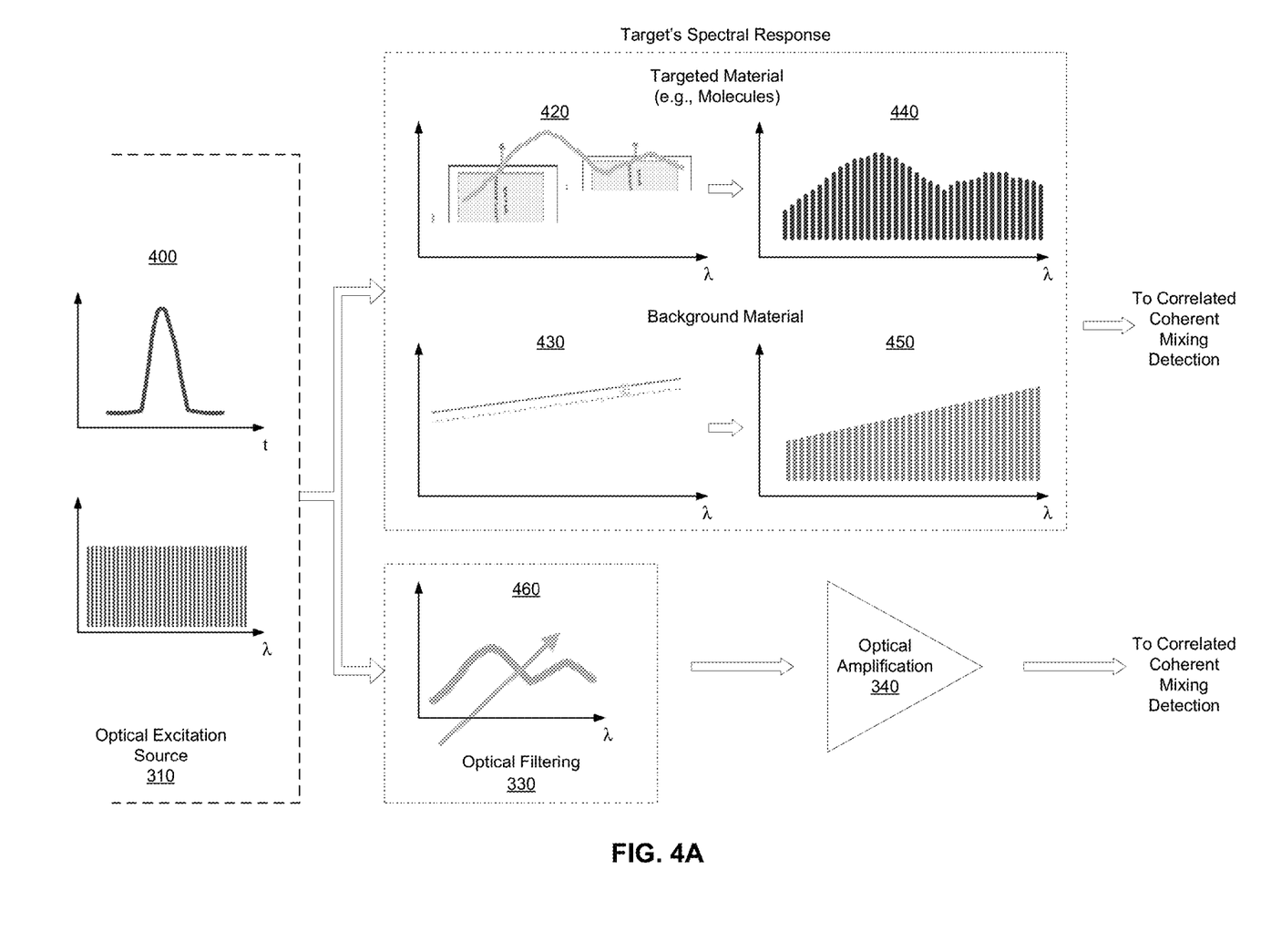
FIGS. 4A-4B illustrate an example use case when utilizing a biosensor system in accordance with an example implementation based on the present disclosure.
Figure 4B:
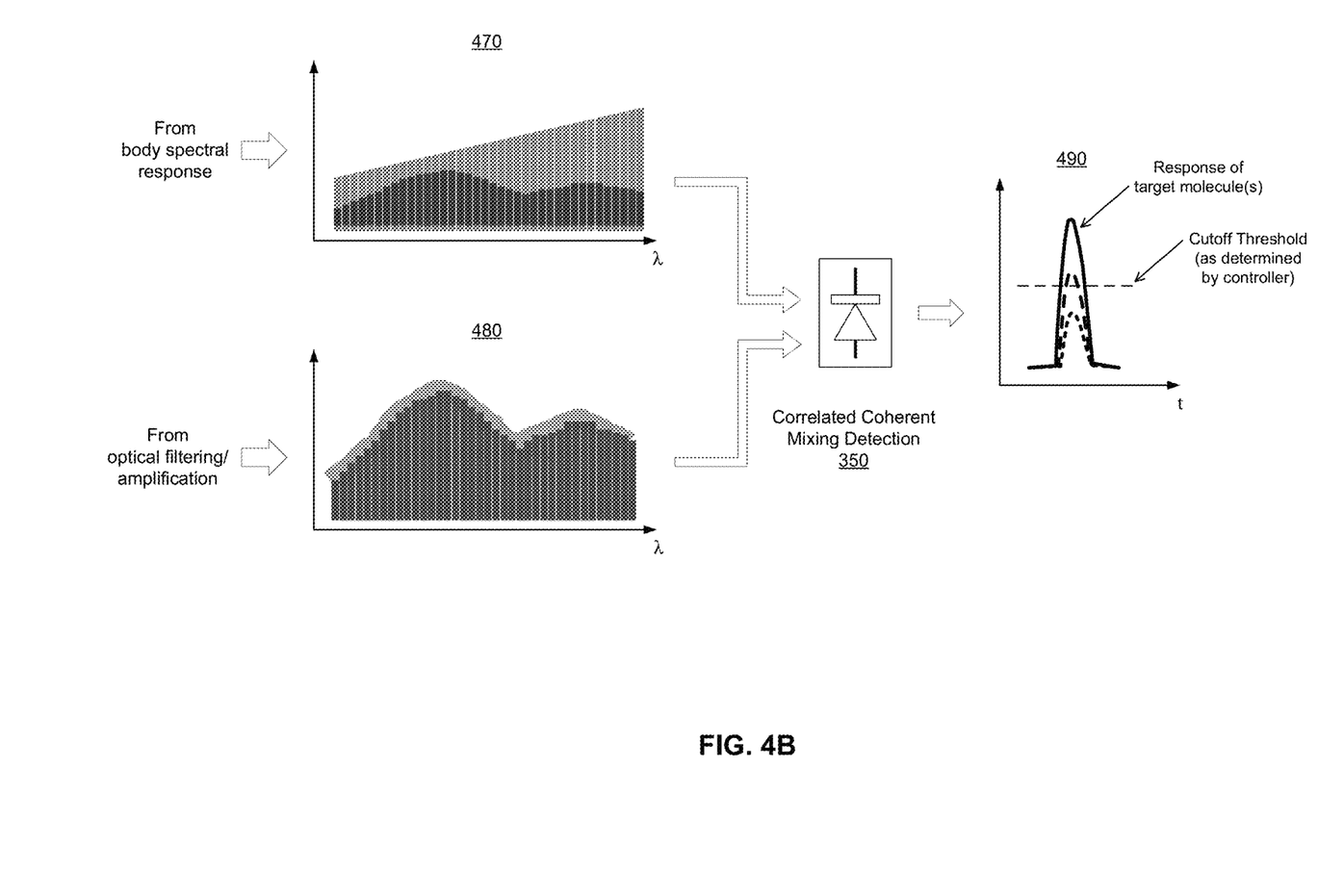

FIGS. 4A-4B illustrate an example use case when utilizing a biosensor system in accordance with an example implementation based on the present disclosure. Shown in FIGS. 4A-4B are the signals that may be generated in the biosensor system 300 during an example use case scenario.

In this regard, the optical excitation source 310 generates an excitation signal 400 that is adaptively configured to enable recording both intensity and phase responses of sets of frequency combs to cover a wide spectral range, and does so simultaneously (or at least concurrently). In particular, as illustrated in FIG. 4A, the excitation signal 400 may be one or a set of pulse signals to cover several frequency bands (as illustrated in the time-domain graph with one set of pulse for one frequency band) that each pulse processes a spectrum consisting of a series of correlated discrete, equally spaced combs (correlated frequency lines), as illustrated in the frequency-domain graph. The excitation signal 400 is applied to a target (e.g., body contact), which may comprise both targeted biochemical material (agent) and background (untargeted) materials. Example spectral profiles of targeted biochemical material and background material are illustrated in, respectively, graphs 420 and 430. Accordingly, applying a portion of the excitation signal 400 to the target results in spectral responses corresponding to both of the targeted biochemical material and background material. In this regard, the spectral responses of the targeted biochemical material and the background material are illustrated in, respectively, graphs 440 and 450. As shown, each of the spectral responses comprises multiples lines of corresponding amplitude and phase, which are set (adjusted) based on the corresponding spectral profiles of the targeted biochemical material and the background material (graphs 420 and 430). As such, the combined spectral response signal 470 (as captured by the photodetector 352) comprises both spectral responses of the targeted biochemical material and the background material.

Concurrently, the remaining portion of the excitation signal 400 is used in generating a spectral response reference signal 480. In this regard, the spectral response reference signal 480 is simultaneously created by applying the excitation signal 400 to the configured optical filter to produce a prescribed filtering spectral shape and response, such as by use of a pre-trained matched spectral reference signal of the target agent 460 (which may be provided by the control parameters from the pre-trained spectral library block 320). In this regard, the matching target spectral reference signal 460 corresponds to a pre-trained spectral representation of the targeted material, as stored (e.g., constructed) in the system. As such, the optical filtering allows for configuring the excitation signal 400—that is, prescribe the amplitude and phase at each of the discrete frequency lines—according to pre-trained spectral characteristics corresponding to the targeted biochemical. The output of the optical filtering is then subjected to optical amplification (e.g., via the optical amplifier 340) to balance out the difference in path loss and delay of the test setup, resulting in the spectral response reference signal 480. Thus, the spectral response reference signal 480 effectively represents an amplified copy of the spectral response of the targeted material when subjected to the excitation signal 400 without any background materials.

The spectral response reference signal 480 and the combined spectral response signal 470 are then subjected to correlated coherent mixing detection (e.g., via the correlated coherent mixing detection block 350). In this regard, the correlated coherent mixing detection comprises coherently combining (e.g., by multiplying) line-by-line the spectral response reference signal 480 and the combined spectral response signal 470, which results in larger response (pulses) if the ensemble from all comb lines are constructively added together over the spectral range, when the frequency response of the targeted agent is similar to that coming from the reference filter for each comb line, compared to the uncorrelated frequency response from background material; thus allowing for filtering out of the background material. In this regard, because of mismatch in amplitude and phase of each comb line over the spectral range, the ensemble response corresponding to the background material will be destructively combined and significantly reduced.

In some instances, results of the correlated coherent mixing detection may be used to update the spectral profile of a targeted material or established a new type of targeted material. For example, when a known material is used as the target material, the results of the correlated coherent mixing detection may be fed back to optimize the control parameters of the optical filter, such that to update existing reference element library into spectral library block 320.

In some implementations, the same processing path described herein may be used to build and/or calibrate the spectral library. For example, a sample of a particular biochemical agent may be subjected to the detection in controlled environment—that is, without any background material. The corresponding captured spectral response may then enable creating a new reference signal, or updating an existing reference signal, in the spectral library.

Figure 5:
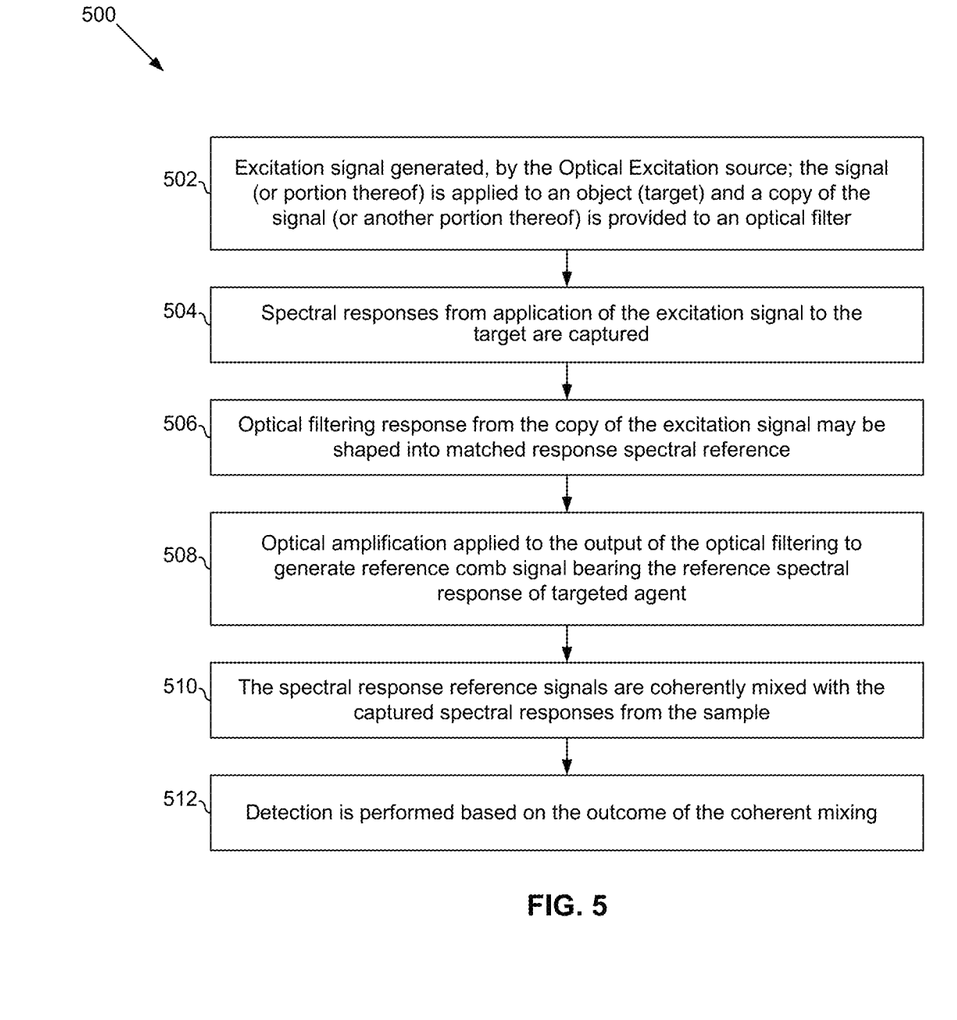
FIG. 5 is a flow chart illustrating biochemical detection with ultra wideband coherent optical combs based on the present disclosure.

FIG. 5 is a flow chart illustrating biochemical detection with ultra wideband coherent optical combs based on the present disclosure. Shown in FIG. 5 is flow chart 500, comprising a plurality of example steps (represented as blocks 502-512), which may be performed in a suitable system (e.g., the biosensor system 300 of FIG. 3) to provide enhanced biochemical detection using ultra wideband coherent optical combs.

In step 502, an excitation signal is generated (e.g., by one or more pulsed comb laser sources). The number of laser sources with associated frequency lines will be selected to provide spectral range or bands that the specific material or agent of interest exhibits distinguished spectral characteristics. A portion of the excitation signal is then applied to an object comprising targeted biochemical agent/material, and possibly, background materials of different kind. Other portion of the excitation signal is concurrently provided to an optical filter configured based on match response spectral reference (signal) corresponding to the targeted biochemical agent/material.

In step 504, spectral responses from application of the excitation signal to the target are captured—e.g., resulting in a combined spectral response signal comprising spectral responses corresponding to both of the targeted biochemical agent/material and the background material.

In step 506, optical filtering response from the copy of the excitation signal will be shaped into a matched response as the pre-trained spectral reference of targeted agent, and in step 508, optical amplification applied to the output of the optical filtering, to generate a reference comb signal bearing the reference spectral response of targeted agent.

In step 510, the spectral response reference signal is coherently mixed with the captured spectral responses from the sample (e.g., into the combined spectral response for each frequency line), and in step 512, detection is performed based on the ensemble outcome of the coherent mixed frequency lines.

Accordingly, solutions based on the present disclosure offer many advantages over conventional solutions. In particular, implementations based on the present disclosure allow for positive discrimination with both amplitude and phase information. This may allow for more precise correlated spectral response line-by-line in frequency over a wide spectral coverage without knowing or locked to specific frequency grids when using multiple independent excitation laser sources. These implementations may also have high sensitivity. In this regard, matched filter operation may reduce random noises and responses from unwanted background materials, and/or use of coherent gain provided by the amplified and shaped reference light from the same excitation laser source. In addition, the need for frequency measures, such as use of frequency grid or frequency locking, may be obviated in these implementations. This is due to accuracy in coherent self-referenced detection within photo lifetime of source laser. Also, small number of low cost gain-switched or mode-locked pulsed lasers may be used to cover a large spectral range. Further, these implementations may incorporate advanced processing techniques, such as use of cognitive learning and tracking with AI/ML. In this regard, use of such techniques may allow for multi-domain identifications of multiple bio-agents with composite spectral responses. Further, such techniques may allow for adapting to variations of physical channels from changes in contacts, environments.

An example system for biosensing, in accordance with the present disclosure, comprises an optical excitation source configured to generate an optical excitation signal; a programmable optical filter configured to apply optical filtering; an optical detector; and detection circuitry configured to apply coherent mixing detection; where the system is configured such that, during a biosensory operation: the optical excitation signal is applied to a biochemical sample, with the biochemical sample comprising at least one targeted biochemical agent; the optical detector captures a first signal comprising spectral responses corresponding to applying the optical excitation signal to the biochemical sample; the programmable optical filter applies optical filtering to a copy of the optical excitation signal, based on a matching target reference signal that comprises a spectral response profile for the at least one targeted biochemical agent; and the detection circuitry applies coherent mixing detection of the first signal with a second signal generated based on applying the optical filtering to the copy of the optical excitation signal, where applying coherent mixing detection comprises combining the first signal and the second signal line-by-line.

In an example embodiment, the optical excitation source comprises a pulsed comb laser source.

In an example embodiment, the system further comprises an optical amplifier configured to apply optical amplification to enhance the coherent mixing gain in the detector, where the optical amplifier applies optical amplification to an output of the programmable optical filter to generate the second signal.

In an example embodiment, the system further comprises control and spectral library circuitry configured to provide reference signals for use in detecting one or more targeted biochemical agents.

In an example embodiment, the control and spectral library circuitry is configured to provide the matching target reference signal to the programmable optical filter.

In an example embodiment, the control and spectral library circuitry is configured to provide control data to the detection circuitry for applying the coherent mixing detection.

In an example embodiment, the control and spectral library circuitry is configured to maintain a spectral library comprising one or more reference signals corresponding to the one or more targeted biochemical agents.

In an example embodiment, the control and spectral library circuitry is configured to generate or update at least one reference signal of the reference signals in the spectral library.

In an example embodiment, the control and spectral library circuitry is configured to generate or update the at least one reference signal using artificial intelligence (AL) based processing.

In an example embodiment, the control and spectral library circuitry is configured to, when using the artificial intelligence (AL) based processing, apply machine learning (ML).

An example method for biosensing, in accordance with the present disclosure, comprises generating, via an optical excitation source, an optical excitation signal; applying the optical excitation signal to a biochemical sample, the biochemical sample comprising at least one targeted biochemical agent; capturing, via an optical detector, a first signal comprising spectral responses corresponding to applying the optical excitation signal to the biochemical sample; applying, via a programmable optical filter, optical filtering to a copy of the optical excitation signal, based on a matching target reference signal that comprises a spectral response profile for the at least one targeted biochemical agent; and applying coherent mixing detection to the first signal and a second signal generated based on applying the optical filtering to the copy of the optical excitation signal; where applying coherent mixing detection comprises combining the first signal and the second signal line-by-line.

In an example embodiment, the optical excitation signal comprises a pulsed comb laser signal.

In an example embodiment, the method further comprises applying optical amplification to an output of the optical filtering, to generate the second signal.

In an example embodiment, the method further comprises configuring the optical filtering based on the matching target reference signal.

In an example embodiment, the method further comprises configuring the optical filtering to reshape the copy of the optical excitation signal based on the matching target reference signal.

In an example embodiment, the method further comprises generating control data for controlling applying the coherent mixing detection.

In an example embodiment, the method further comprises maintaining a spectral library comprising one or more reference signals corresponding to one or more targeted biochemical agents.

In an example embodiment, the method further comprises generating or updating at least one reference signal of the reference signals in the spectral library.

In an example embodiment, the method further comprises generating or updating the at least one reference signal using artificial intelligence (AL) based processing.

In an example embodiment, the method further comprises, when using the artificial intelligence (AL) based processing, applying machine learning (ML).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z."

As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system for biosensing, the system comprising:
   an optical excitation source configured to generate an optical excitation signal;
   a programmable optical filter configured to apply optical filtering;
   an optical detector; and
   detection circuitry configured to apply coherent mixing detection;
   wherein the system is configured such that, during a biosensory operation:
      the optical excitation signal is applied to a biochemical sample, the biochemical sample comprising at least one targeted biochemical agent;
      the optical detector captures a first signal comprising spectral responses corresponding to applying the optical excitation signal to the biochemical sample;
      the programmable optical filter applies optical filtering to a copy of the optical excitation signal, based on a matching target reference signal that comprises a spectral response profile for the at least one targeted biochemical agent; and
      the detection circuitry applies coherent mixing detection to the first signal and a second signal generated based on applying the optical filtering to the copy of the optical excitation signal, wherein applying coherent mixing detection comprises combining the first signal and the second signal line-by-line.

2. The system according to claim 1, wherein the optical excitation source comprises a pulsed comb laser source.

3. The system according to claim 1, further comprising an optical amplifier configured to apply optical amplification, and wherein the optical amplifier applies optical amplification to an output of the programmable optical filter to generate the second signal.

4. The system according to claim 1, further comprising control and spectral library circuitry configured to provide reference signals for use in detecting one or more targeted biochemical agents.

5. The system according to claim 4, wherein the control and spectral library circuitry is configured to provide the matching target reference signal to the programmable optical filter.

6. The system according to claim 4, wherein the control and spectral library circuitry is configured to provide control data to the detection circuitry for applying the coherent mixing detection.

7. The system according to claim 4, wherein the control and spectral library circuitry is configured to maintain a spectral library comprising one or more reference signals corresponding to the one or more targeted biochemical agents.

8. The system according to claim 7, wherein the control and spectral library circuitry is configured to generate or update at least one reference signal of the reference signals in the spectral library.

9. The system according to claim 8, wherein the control and spectral library circuitry is configured to generate or update the at least one reference signal using artificial intelligence (AL) based processing.

10. The system according to claim 9, wherein the control and spectral library circuitry is configured to, when using the artificial intelligence (AL) based processing, apply machine learning (ML).

11. A method for biosensing, the method comprising:
generating, via an optical excitation source, an optical excitation signal;
applying the optical excitation signal to a biochemical sample, the biochemical sample comprising at least one targeted biochemical agent;
capturing, via an optical detector, a first signal comprising spectral responses corresponding to applying the optical excitation signal to the biochemical sample;
applying, via a programmable optical filter, optical filtering to a copy of the optical excitation signal, based on a matching target reference signal that comprises a spectral response profile for the at least one targeted biochemical agent; and
applying coherent mixing detection to the first signal and a second signal generated based on applying the optical filtering to the copy of the optical excitation signal;
wherein applying coherent mixing detection comprises combining the first signal and the second signal line-by-line.

12. The method according to claim 11, wherein the optical excitation signal comprises a pulsed comb laser signal.

13. The method according to claim 11, further comprising applying optical amplification to an output of the optical filtering, to generate the second signal.

14. The method according to claim 11, further comprising configuring the optical filtering based on the matching target reference signal.

15. The method according to claim 14, further comprising configuring the optical filtering to reshape the copy of the optical excitation signal based on the matching target reference signal.

16. The method according to claim 11, further comprising generating control data for controlling applying the coherent mixing detection.

17. The method according to claim 11, further comprising maintaining a spectral library comprising one or more reference signals corresponding to one or more targeted biochemical agents.

18. The method according to claim 17, further comprising generating or updating at least one reference signal of the reference signals in the spectral library.

19. The method according to claim 18, further comprising generating or updating the at least one reference signal using artificial intelligence (AL) based processing.

20. The method according to claim 19, further comprising, when using the artificial intelligence (AL) based processing, applying machine learning (ML).

* * * * *